Patented Aug. 28, 1951

2,566,149

UNITED STATES PATENT OFFICE 2,566,149

TEXTILE SIZE CONTAINING POLYMETHA-CRYLIC ACID, A POLYMETHACRYLIC ACID SALT, AND A WETTING AGENT

Daniel E. Strain, Wilmington, Del., assignor to E. I. du Pont de Nemours & Company, Wilmington, Del., a corporation of Delaware No Drawing. Application January 7, 1948, Serial No. 1,055

3 Claims. (Cl. 260—80)

This invention relates to a two step process for the preparation of granular polymethacrylic acid in which methacrylic acid is polymerized in water, in the first step, to give a spray driable polymethacrylic acid, and in which the polymethacrylic acid is converted to a dry powder, in the second step, to give a relatively hot water soluble product especially useful as a textile size.

Methacrylic acid and its polymerization has been known for a number of years (Ber. 30, 1227). Various methods have been proposed for polymerizing the acid, the polymerization being generally effected by heating the acid in the presence of benzoyl peroxide, a persulphate or a suitable peroxy catalyst. The known polymerization processes, however, such as those described in the D. E. Strain U. S. Patent 2,121,839, and in the H. R. Dittmar U. S. Patent 2,289,540 produce the polymer in solution from which the preparation of a solid polymer suitable for many important uses in the arts is difficult and generally uneconomical. Moreover, polymethacrylic acid is more insoluble in hot water than in cold water. To produce the acid as a granular powder, readily soluble in hot water, would constitute a decided advance in this art.

An object of the present invention is to provide a commercial and economical process for the preparation of polymethacrylic acid in granular form. Another object is to provide a process for the polymerization of methacrylic acid having superior solubility characteristics for spray drying and for use as a sizing agent. Still another object is to provide a process for the polymerization of methacrylic acid in an aqueous solution, which aqueous solution of the polymer can be spray dried to give a product easily dissolved for use in the arts. A further object is to provide a new composition of matter useful as a textile size. Other objects and advantages of the invention will hereinafter appear.

The process of this case involves the preparation of a granular readily transportable and hot water soluble polymethacrylic acid powder by three operations. First, the monomeric acid is polymerized in a solvent medium and in such form that the polymeric solution of the acid is spray driable. Second, the polymeric acid is conditioned by an operation conducted prior to, during or subsequent to the polymerization of the acid, the conditioning being characterized by at least three functions, described hereinafter. Third, the polymeric acid is then spray dried to give a granular powder.

Due, inter alia, to that property of polymethacrylic acid which makes it relatively insoluble in hot water though soluble in cold water, and to the further fact that it gives a gel-like, difficultly transportable, i. e., pumpable hot water solution and, furthermore, because of the relatively low solubility of the polymeric acid in hot water, no commercially acceptable process was known, prior to this invention, for preparing a hot water soluble polymer as a dry powder via the relatively inexpensive process of water polymerization.

The acid may be polymerized in this manner. An aqueous solution is first prepared containing from 7 to 12% and preferably 8 to 10% by weight of monomeric methacrylic acid. This solution is polymerized in accord with the well-known methods of polymerization that is, for example, by heating in the presence of a polymerization catalyst such as, benzoyl peroxide or other peroxide catalyst. Generally, the polymerization is conducted by dissolving a specified amount of monomeric methacrylic acid in the water, adding from 0.01 to 3% benzoyl peroxide based on the weight of methacrylic acid and then heating the resulting solution to about 80 to 90° C. with adequate provision for dissipation of the exothermic heat of polymerization. The polymerization takes place rapidly and is usually completed in a period of a few minutes. As a result of this polymerization, a hot water soluble polymer is obtained providing this solution is conditioned in accord with the conditioning procedure described hereinafter.

The conditioning is preferably effected by the addition of a conditioning agent or agents prior to polymerization of the acid although, as has been stated, the time of addition is not essential. The conditioning operation performs at least these three functions. The first is to provide a solution of polymethacrylic acid and water in such a form that it can be pumped with facility, or be in a form such that it can be handled in the spray drying equipment at the required temperatures for spray drying. The second function is allied with the first in that the necessary treatment to render the polymeric acid water solution spray driable, likewise conditions the final product for use in the art, particularly as a sizing medium for the treatment of textiles. Finally, the third function of the conditioning treatment is to render the spray dried polymethacrylic acid readily soluble in hot water.

An important feature of the invention, accordingly, involves this conditioning of the methacrylic acid prior, during or subsequent to its polymerization. This feature includes the treatment of the aqueous solution of the monomeric acid with an organic or inorganic base to neutralize a small portion of the acid. Examples of these bases are the hydroxides or carbonates of the alkali metals or ammonia as well as an organic base such as pyridine, ethanolamine, and the like. This neutralization requires the addition of an amount of the base such that it is equivalent theoretically to the neutralization, by titration of at least 0.3% of the acid, and its conversion to, for example, sodium polymethacrylate. The neutralization may be extended to from 0.3% to not more than 12%. This may be accomplished by adding the base to an aqueous solution of the acid prior to polymerization, although the addition may, if desired, be made subsequent to polymerization. The partial neutralization has a remarkable and unexpected result on the water solubility of the polymeric acid. In the absence of the base, 7% by weight of polymethacrylic acid in water is insoluble at temperature above 75° C. The addition of the base, however, results in complete solubility of such a solution and also solutions containing up to 10% acid even up to the boiling point of the mixture. The addition, accordingly, of this conditioning agent to the aqueous solution of the monomeric acid provides a means of holding the subsequently formed polymethacrylic acid in solution, even when this acid is heated up prior to passing it into the spray drying equipment.

The presence of a small amount of neutralized acid likewise has an appreciable influence on the viscosity of an aqueous solution of the polymethacrylic acid. For example, a 9% aqueous solution of polymethacrylic acid has a viscosity at 32° C. of 1400 centipoises, while a solution of the same concentration, 5% of which has been neutralized after polymerization has a viscosity of 26 centipoises. A similar lowering of viscosity results if the neutralization is carried out before polymerization. Aqueous solutions of the partially neutralized polymethacrylic acid are, accordingly, much more readily pumped through pipes and equipment of the spray drying apparatus.

A further feature of the invention associated with the polymerization step and conditioning of the polymer involves the addition of a wetting agent prior to the spray drying operation. This wetting agent which may be a sulfonated long chain fatty acid and/or alcohol and their alkali metal salts or other suitable wetting agent, may be added at any time during the polymerization stage, either before, during or after polymerization. The wetting agent is employed to give from 0.01 to 5% thereof based on the weight of polymethacrylic acid, which amount is sufficient to render the spray dried polymer quickly water soluble. As a result of the conditioning and wetting treatment, therefore, the spray dried methacrylic acid powder will contain 0.3% or more of neutralized acid and a sufficient amount of a wetting agent to render it readily and quickly wetted thus hastening solution in water.

The final or spray drying step of the process may be carried out in any suitable manner and in any suitable type of spray drying apparatus, although preferably a spray drier is used that maintains the sprayed particles at a sufficiently high temperature until the desired amount of water has evaporated, the cooling of the product being deferred until the product has dried to the desired moisture content. This is done because of the greater solubility of the polymeric acid in cold water than in hot water. Spray drying equipment is preferred for this type of operation in which the fluid product to be dried is atomized into warm air and held in contact with auxiliary warm air until complete drying is attained. Such a spray drying apparatus is described in the U. S. Patent 2,436,355 of H. M. Cadot. Apparatus of this nature has provisions for the admission of auxiliary air which may be either cooled or heated, cooled air being employed in the apparatus of the aforementioned application, although heated air can readily be substituted and should be used when spray drying polymethacrylic acid.

The examples which follow illustrate preferred embodiments of the invention in which parts are by weight unless otherwise stated:

*Example 1.*—Distilled water, 315 lbs., was placed in a 50 gallon glass lined, jacketed kettle and heated to 79° C. Then 37 lbs. of methacrylic acid monomer (94.7% pure) containing 0.525 lb. of dissolved benzoyl peroxide (1.5% of the monomer) was run in with vigorous agitation. The batch was then heated cautiously to 90° C. from which point the temperature rose spontaneously to 98.5° C. Cooling water was run into the kettle jacket when the temperature had reached 97° C. to prevent boiling of the batch (which would have caused foaming). Twenty-five minutes elapsed from the time monomer addition to the water was begun and the maximum temperature was attained. The batch was held at 94 to 98° C. for thirty minutes more and then cooled. The polymer which had formed as a white, suspended precipitate at temperatures above 90° C. redissolved as the batch was cooled below 75° C. with continued agitation.

The resulting solution contained 9.9% solids, determined by evaporation, and had a pH of 2.7 at room temperature. On dilution to 8% solids content the aqueous solution had a bubble tube viscosity of 0.65 poise.

It was found that, on heating the undiluted solution, precipitation of the polymer began at 74 to 75° C. and that, after heating at 80 to 85° C. to cause complete precipitation, the polymer redissolved on cooling below 74 to 75° C. Addition of 0.3% of the theoretical amount of NaOH for neutralization was just barely sufficient to prevent precipitation of polymer from the solution at its boiling point, 100° C.

*Example 2.*—To 95.7 grams of methacrylic acid monomer (95% pure) was added 1.67 grams of NaOH, 5% of the theoretical amount for complete neutralization. Benzoyl peroxide (1.08 grams) was dissolved in this partially neutralized monomer and the solution then added, with agitation, to 648 grams of water at 90° C. The batch temperature fell to 85° C., was brought back to 90° C. by heating, and then rose spontaneously to 90.8° C. The batch was held at 90° C. or over for 72 minutes with continuous stirring and then cooled. It contained a small amount of a white precipitate, formed when the monomer was first run into the hot water, which settled out on standing. The clear solution had a viscosity of 47 centipoises at room temperature as measured by a Brookfield Synchro Electric Viscosimeter.

*Example 3.*—A 5% solution in water of the partially neutralized product of Example 2 was further treated with 1% by weight of a sulfonated lauryl alcohol wetting agent. The resulting solution was heated to a temperature of about 80° C. and then sprayed from a rapidly rotating disk into a drying chamber, wherein the comminuted material immediately contacted air at a temperature between 100° and 300° C. The particles of polymethacrylic acid dried readily and settled to the bottom of the chamber from which they were periodically withdrawn. This granular product dissolves rapidly in water, although it can be packaged as a granular material in containers without undue caking.

*Example 4.*—A skein of 45-denier, 20-turn polyhexamethylene adipamide yarn was treated by immersion in an aqueous bath containing 8% of the granular product made in accord with the process of Example 3. This yarn was used in knitting stocking fabric on a Wildman full-fashioned knitting machine. The yarn was moistened just before knitting and the knitted fabric was dried immediately after it left the needles and sinkers by a current of warm air. The yarn knit well, producing a fabric of excellent stitch formation which showed practically no edge rolling and which had no pulled threads. The polymethacrylic acid size was completely removed by heating in boiling water.

*Example 5.*—A sizing solution for weaving is prepared by dissolving 7 parts of dried partially neutralized polymethacrylic acid in 88 parts of water by weight. The mixture is warmed (100–170° F.) to facilitate solution. Five parts by weight of a sulfonated vegetable oil is added, the solution stirred and the temperature raised to 170° F. Sizing is carried out using a bath temperature of 140°–170° F. and with equipment designed for the silk system although cotton system equipment may be used. A nylon warp is drawn through the size solution, between squeeze rolls and over drying cans adjusted in the range of 140°–200° F. from first to last. The warp is wound on a beam with essentially no stretch. The size can be thoroughly removed by washing in hot water.

*Example 6.*—The sizing solution is prepared by dissolving 8 parts of dried partially neutralized polymethacrylic acid in 86.6 parts of water and 5.4 parts of ethylene glycol. Sizing is carried out as outlined in Example 5.

*Example 7.*—The sizing solution is prepared by dissolving 5 parts of dried partially neutralized polymethacrylic acid in 90 parts of water, warming to facilitate solution. When solution has been effected 3.33 parts of a sulfonated oil, for example Twitchell Oil 3X, and 1.67 parts of ethylene glycol are added. Sizing is carried out as outlined in Example 5.

Dry polymeric methacrylic acid powder obtained in accord with the process of this invention may be used widely in any of the normal uses to which this acid is employed in commerce. The polymeric acid powder has, in addition to the normal utility of the acid, exceptional utility as a sizing agent for the treatment of many natural and synthetic fibers, and more particularly the smooth, high gloss fibers of the polyamides such as, nylon, or the polyester, polyacrylonitrile, regenerated cellulose, cellulose acetate, and like fibers or filaments. Polymethacrylic acid per se has the ability to stick tenaciously to such smooth, glossy filaments but is unacceptable as a sizing agent for the reason that it cannot be washed with water hotter than 75° C. from the textile after weaving. On the other hand, the sodium salt of polymethacrylic acid, while it is hot water soluble, does not stick to the smooth, polished, polyamide fibers and, consequently, is of no utility whatever as a sizing agent for this material. The products of the instant case, however, containing as they do in the order of 0.3% neutralized polymeric acid, stick for all practical purposes, as tenaciously as does the unneutralized acid to such filaments and, at the same time, can be washed from knitted or woven cloth with hot water after the weaving or spinning operations. Moreover, the presence of such small amounts of neutralized material in the polymethacrylic acid does not decrease the value of such acid for normal uses. The amount of neutralized acid, however, should not exceed 12% by weight for the ability to adhere to such material as nylon falls off rapidly above this amount.

It appears to be immaterial whether or not an organic or inorganic base is used. It likewise appears to be immaterial whether or not the acid is neutralized in the polymerization bath or whether the neutralized acid is added as such to the bath to give an aqueous solution containing a mixture of, for example, at least 0.3% sodium polymethacrylate based on the weight of polymethacrylic acid. In other words, substantially the same effect can be obtained by adding monomeric or polymeric sodium methacrylate to the methacrylic acid or polymethacrylic acid and water to give the same proportion, namely, about 0.3% or more of neutralized acid. Such a solution containing the monomeric acid after polymerization, of course, can be spray dried with facility and with the advantages above described, for the preparation of polymethacrylic acid by the addition of a base directly to the acid.

I claim:

1. A textile size comprising a polymethacrylic acid powder, soluble in water to the extent of at least 10% at 100° C., containing from 0.3% to 12% based on the weight of polymethacrylic acid, of polymethacrylic acid neutralized with a base of the group consisting of alkali metals, ammonium and organic bases and from 0.01% to 5% of a wetting agent based on the weight of polymethacrylic acid.

2. A textile size comprising a polymethacrylic acid powder, soluble in water to the extent of at least 10% at 100° C., containing from 0.3% to 12% based on the weight of polymethacrylic acid, of polymethacrylic acid neutralized with a base of the group consisting of alkali metals, ammonium and organic bases and from 0.01% to 5% of a sulfonated lauryl alcohol wetting agent.

3. A textile size comprising a polymethacrylic acid powder, soluble in water to the extent of at least 10% at 100° C., containing from 0.3% to 12% based on the weight of polymethacrylic acid, of polymethacrylic acid neutralized with sodium hydroxide and from 0.01% to 5% of a sulfonated lauryl alcohol wetting agent.

DANIEL E. STRAIN.

REFERENCES CITED

The following references are of record in the file of this patent:

UNITED STATES PATENTS

| Number | Name | Date |
| --- | --- | --- |
| 2,101,635 | Bender | Dec. 7, 1937 |
| 2,133,257 | Strain | Oct. 11, 1938 |
| 2,205,883 | Graves | June 25, 1940 |
| 2,289,540 | Dittmar et al. | July 14, 1942 |
| 2,326,078 | Trommsdorff et al. | Aug. 3, 1943 |
| 2,356,896 | Smith | Aug. 29, 1944 |